US008893601B2

(12) United States Patent
Chiang et al.

(10) Patent No.: US 8,893,601 B2
(45) Date of Patent: Nov. 25, 2014

(54) SAW MACHINE RIVING KNIFE ADJUSTMENT MECHANISM

(75) Inventors: Hung-Jung Chiang, Taichung (TW); Wen-Chin Chiang, Taichung (TW)

(73) Assignee: Rexon Industrial Corp., Ltd., Taichung (TW)

( * ) Notice: Subject to any disclaimer, the term of this patent is extended or adjusted under 35 U.S.C. 154(b) by 496 days.

(21) Appl. No.: 12/855,968

(22) Filed: Aug. 13, 2010

(65) Prior Publication Data

US 2011/0259165 A1 Oct. 27, 2011

(30) Foreign Application Priority Data

Apr. 21, 2010 (TW) ................................ 99112548 A

(51) Int. Cl.

| | |
|---|---|
| ***B23D 19/00*** | (2006.01) |
| ***B23D 45/00*** | (2006.01) |
| ***B27B 3/28*** | (2006.01) |
| ***B27B 5/06*** | (2006.01) |
| ***B27B 5/18*** | (2006.01) |
| ***B27B 27/06*** | (2006.01) |
| ***B27G 19/02*** | (2006.01) |
| ***B27B 5/29*** | (2006.01) |
| ***B27G 19/08*** | (2006.01) |

(52) U.S. Cl.
CPC . *B27G 19/02* (2013.01); *B27B 5/29* (2013.01); *B27G 19/08* (2013.01)
USPC .......................... 83/102.1; 83/471.2; 83/440.2

(58) Field of Classification Search
CPC ........... B27B 5/29; B27G 19/02; B27G 19/08
USPC ............... 83/102.1, 440.2, 477.2, 478, 471.2, 83/438, 102; 403/325, 323, 326, 93, 97
See application file for complete search history.

(56) References Cited

U.S. PATENT DOCUMENTS 3,587,271 A * 6/1971 Rigot .............................. 72/114
4,598,614 A * 7/1986 Kipp .............................. 81/58.3

(Continued)

FOREIGN PATENT DOCUMENTS

| | | | |
|---|---|---|---|
| CN | 2601337 | Y | 1/2004 |
| CN | 101053913 | A | 10/2007 |
| TW | 200909149 | A | 3/2009 |
| TW | 200927340 | A | 7/2009 |

OTHER PUBLICATIONS

Chinese Office Action dated May 30, 2012, for CN 201010170089.8, and English translation thereof.

(Continued)

*Primary Examiner* — Ghassem Alie
*Assistant Examiner* — Bharat C Patel
(74) *Attorney, Agent, or Firm* — Bacon & Thomas, PLLC

(57) ABSTRACT

A saw machine riving knife adjustment mechanism includes a locating frame, which has a slot, a riving knife, which has a longitudinal slot with at least one notch formed along one side of the longitudinal slot, and which is detachably mounted on the locating frame, a biasing member, which is mounted on the locating frame, and a locking member, which is inserted through the longitudinal slot of the riving knife and the slot of the locating frame. The locking member is biased by the biasing member to a locking position where the locking member is engaged with the at least one notch to lock the riving knife in position.

18 Claims, 5 Drawing Sheets

(56) References Cited

U.S. PATENT DOCUMENTS

| | | | | |
|---|---|---|---|---|
| 4,711,145 | A * | 12/1987 | Inoue | 81/177.1 |
| 5,879,100 | A * | 3/1999 | Winkler | 403/325 |
| 6,023,812 | A * | 2/2000 | Morad | 15/257.7 |
| 6,840,144 | B2 | 1/2005 | Huang | |
| 7,028,587 | B1 * | 4/2006 | Chiang | 81/63.1 |
| 7,137,327 | B2 | 11/2006 | Garcia et al. | |
| 7,210,386 | B1 | 5/2007 | Chang | |
| 7,437,981 | B2 * | 10/2008 | Burke et al. | 83/102.1 |
| 7,475,622 | B1 * | 1/2009 | Chang | 83/477.2 |
| 7,540,223 | B2 | 6/2009 | Sasaki et al. | |
| 7,621,204 | B2 * | 11/2009 | Merhar et al. | 83/13 |
| 2004/0011177 | A1 * | 1/2004 | Huang | 83/478 |
| 2004/0118261 | A1 * | 6/2004 | Garcia et al. | 83/471.3 |
| 2005/0000097 | A2 * | 1/2005 | Bednar et al. | 30/392 |
| 2005/0211034 | A1 * | 9/2005 | Sasaki et al. | 83/102.1 |
| 2006/0096428 | A1 | 5/2006 | Garcia et al. | |
| 2007/0034066 | A1 | 2/2007 | Garcia et al. | |
| 2007/0056416 | A1 | 3/2007 | Shibata | |
| 2007/0157784 | A1 | 7/2007 | Gass et al. | |
| 2007/0186739 | A1 | 8/2007 | Peot et al. | |
| 2007/0277661 | A1 * | 12/2007 | Domeny et al. | 83/477.2 |
| 2008/0022826 | A1 * | 1/2008 | Weir et al. | 83/478 |
| 2008/0047410 | A1 | 2/2008 | Chuang | |
| 2008/0168875 | A1 | 7/2008 | Liu et al. | |
| 2008/0302445 | A1 * | 12/2008 | Shibata et al. | 144/193.1 |
| 2009/0145275 | A1 | 6/2009 | Chuang | |
| 2009/0158906 | A1 | 6/2009 | Shibata | |
| 2009/0205472 | A1 | 8/2009 | Sasaki et al. | |
| 2009/0266213 | A1 * | 10/2009 | Liu et al. | 83/471.2 |
| 2009/0288303 | A1 * | 11/2009 | Liao | 30/293 |
| 2010/0005937 | A1 | 1/2010 | Weston et al. | |
| 2010/0126324 | A1 * | 5/2010 | Liu et al. | 83/438 |

OTHER PUBLICATIONS

Chinese Office Action dated Nov. 15, 2012, for CN 201010170089.8, and English translation thereof.

Chinese Office Action dated May 6, 2013, for CN 201010170089.8, and English translation thereof.

Chinese Office Action dated Nov. 6, 2013, for CN 201010170089.8, and English translation thereof.

Taiwanese Office Action dated Dec. 19, 2012, for TW 099112548, and English translation thereof.

Taiwanese Office Action dated Aug. 9, 2013, for TW 099112548, and English translation thereof.

* cited by examiner

SAW MACHINE RIVING KNIFE ADJUSTMENT MECHANISM

This application claims, under 35 U.S.C. §119, priority to Taiwanese Application No. 099112548, filed Apr. 21, 2010, which application is hereby incorporated by reference herein in its entirety, inclusive of its specification, claims, and drawings.

FIELD OF THE INVENTION

The present invention relates to saw machines and more particularly, to a saw machine riving knife adjustment mechanism, which has excellent structural stability and facilitates dismounting of the riving knife from a saw machine.

BACKGROUND

To avoid jamming of a cutting blade within a workpiece or the occurrence of kickback when the workpiece makes contact with the back teeth of the saw blade, a saw machine generally uses a riving knife in order to keep the cut parts of the workpiece spaced apart from each other, thus enabling the operator to feed the workpiece safely and with less effort.

However, in conventional saw machines, screw bolts are commonly used in order to lock the riving knife to the saw machine. In order to accommodate different working conditions, the riving knife may have to be frequently removed from the saw machine. Due to the use of screw bolts, which must be loosened, such conventional mounting designs complicate dismounting of the riving knife from the saw machine. Further, the conventional mounting design does not provide a satisfactory mechanism for positioning the riving knife. Accordingly, improvements in this regard are necessary.

SUMMARY

In view of the above discussion, an embodiment of a saw machine riving knife adjustment mechanism, which assures positive and accurate positioning of the riving knife, and facilitates dismounting of the riving knife, is described.

The saw machine riving knife adjustment mechanism includes a locating frame, a riving knife, a biasing member, and a locking member. The locating frame has a long slot defined therein. The riving knife has a generally longitudinal slot (which may be generally arcuate in shape) open to one end of the riving knife and at least one notch recessed from the peripheral wall of the longitudinal slot. The biasing member is mounted in the locating frame. The locking member is inserted through the longitudinal slot of the riving knife and the long slot of the locating frame in order to lock the riving knife to the locating frame. The locking member is biased by the first biasing member into engagement with one notch of the riving knife, thus assuring positive positioning of the riving knife.

Subject to the aforesaid design, an operator simply needs to overcome the biasing force applied by the biasing member to the locking member, and allow the locking member be moved away from the notch of the riving knife into the longitudinal slot of the riving knife, such that the riving knife can then be conveniently removed from the locking member and the locating frame along its longitudinal slot, thus achieving easy dismounting of the riving knife from the saw machine.

BRIEF DESCRIPTION OF THE DRAWINGS

These and other features, aspects, and advantages of the present invention will become better understood with regard to the following description, appended claims, and accompanying drawings where:

Figure 1:
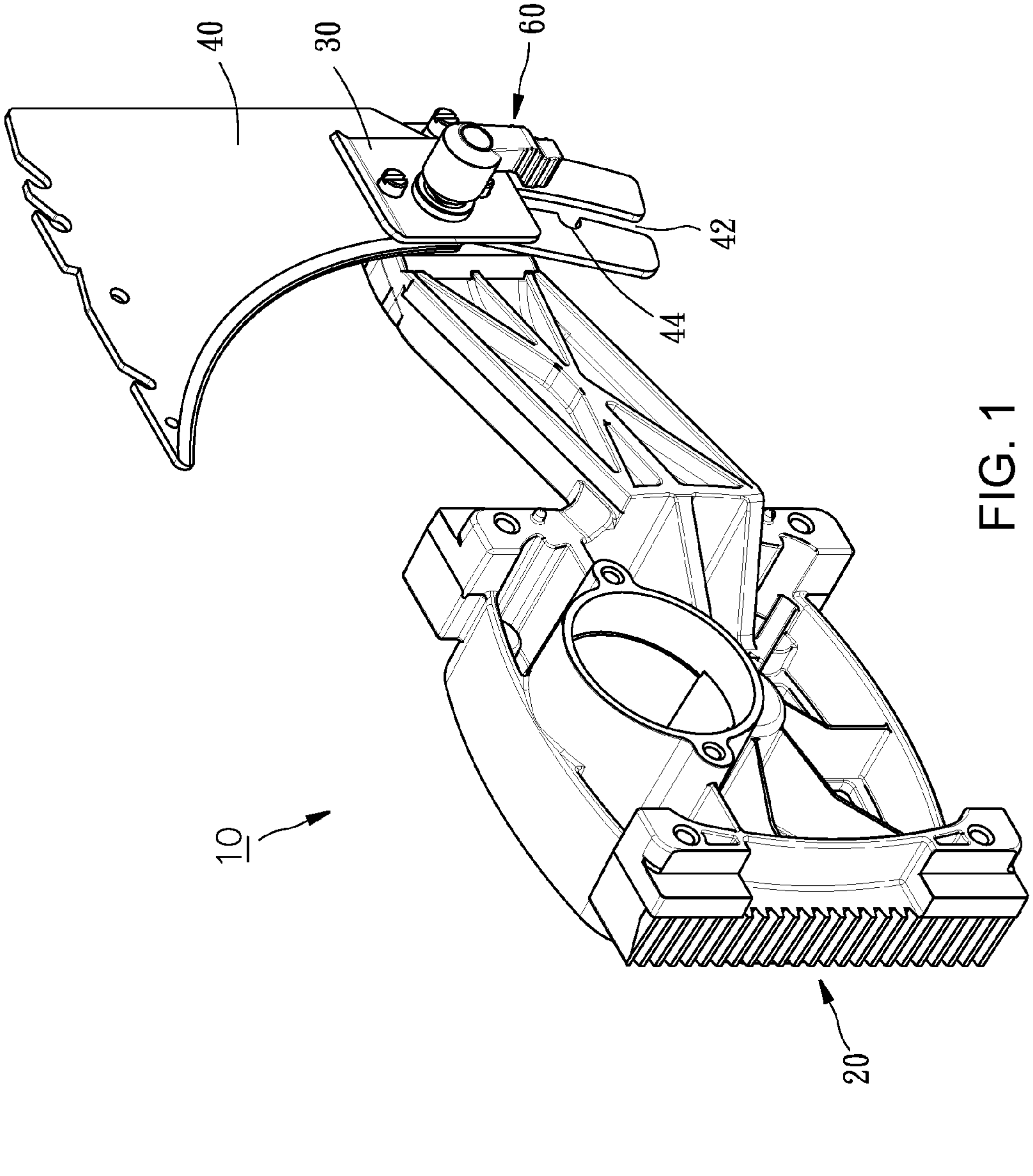
FIG. 1 is an elevational view of a saw machine riving knife adjustment mechanism in accordance with the present disclosure.

It should be noted that the drawing figures are not necessarily drawn to scale, but instead are drawn to provide a better understanding of the components thereof, and are not intended to be limiting in scope, but rather to provide exemplary illustrations. It should further be noted that the figures illustrate exemplary embodiments of a saw machine riving knife adjustment mechanism and the components thereof, and in no way limit the structures or configurations of a saw machine riving knife adjustment mechanism and components thereof according to the present disclosure.

DETAILED DESCRIPTION

Figure 2:
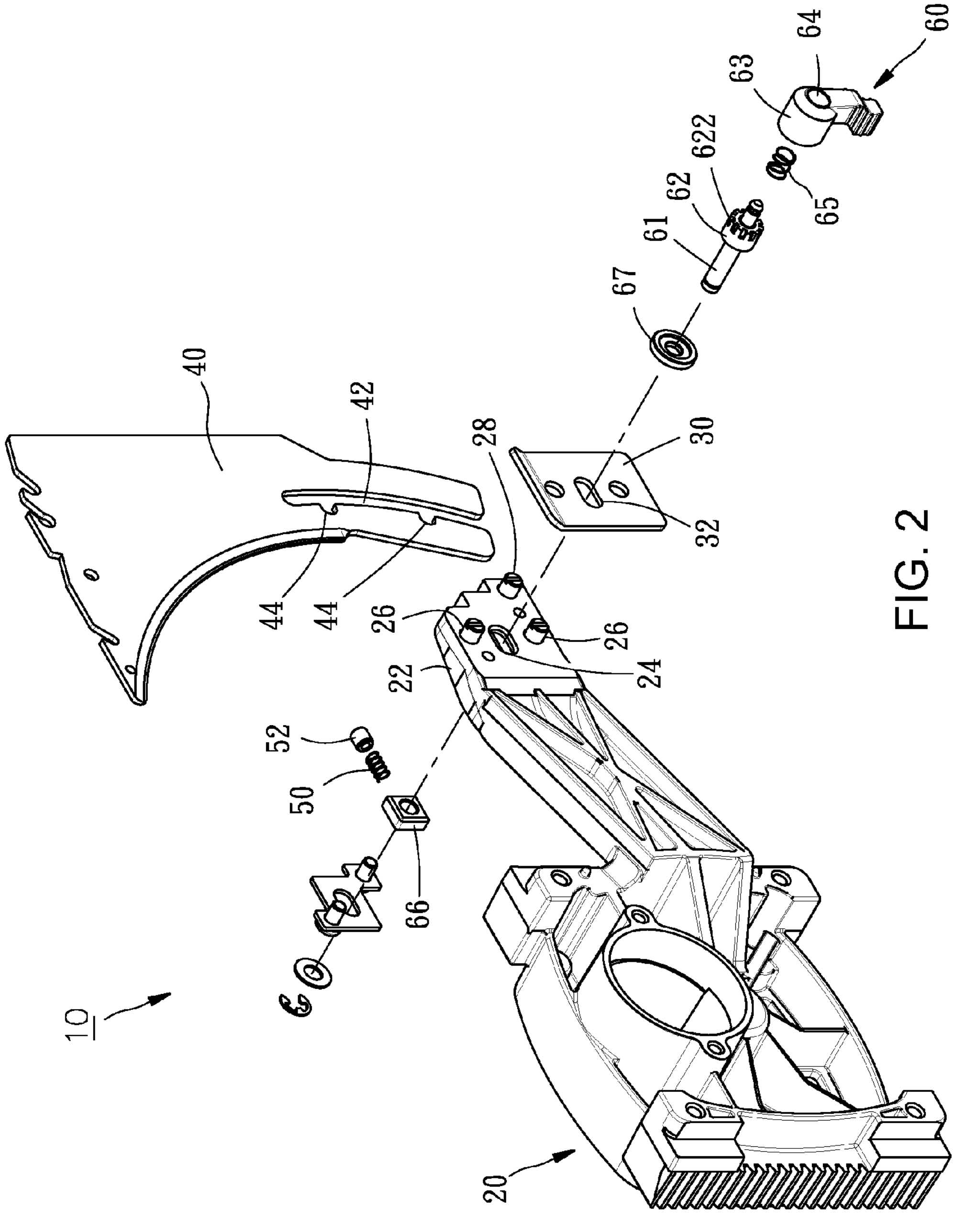
FIG. 2 is an exploded view of the saw machine riving knife adjustment mechanism in accordance with the present disclosure.

Other and further advantages and features of the present disclosure will be understood by reference to the following specification in conjunction with the accompanying drawings. As illustrated in FIGS. 1 and 2, a saw machine riving knife adjustment mechanism 10 is shown having a locating frame 20, a locating plate 30, a riving knife 40, a first biasing member 50, and a lock device set 60.

The locating frame 20 includes a mount 22, a first long slot 24 defined through the mount 22, and two first locating rods 26 extending from the mount 22 and respectively disposed at top and bottom sides relative to the first long slot 24. A second locating rod 28 extends from the mount 22 and is disposed at a lower right side relative to the first long slot 24 towards an end of the locating frame.

The locating plate 30 is configured to be coupled to the first locating rods 26 of the locating frame 20. The locating plate 30 includes a second long slot 32 defined therethrough, which corresponds in size and shape to the first long slot 24 of the locating frame 20.

The riving knife 40 has a longitudinal slot 42 defined therethrough to allow the passage of the first locating rods 26 within the longitudinal slot 42 in order to enable the riving knife 40 to be positioned between the locating frame 20 and the locating plate 30. The riving knife 40 is also movable up and down relative to the locating frame 20, as the first locating rods 26 travel within the longitudinal slot 42. A portion of the riving knife 40 is further configured to abut against the second locating rod 28. Further, the riving knife 40 has two notches 44 formed therein and respectively recessed from a peripheral wall of the longitudinal slot 42. The two notches 44 are respectively disposed along one lateral side of the longitudinal slot 42 near the top bottom sides (first and second ends) of the longitudinal slot 42. The longitudinal slot 42 is generally arcuate in shape, such that the riving knife 40 can travel in an arcuate motion along the first locating rods 26 positioned within the longitudinal slot 42.

The biasing member 50 is fastened to the locating frame 20 by a bolt 52, and disposed at the back side of the mount 22.

Figure 3:
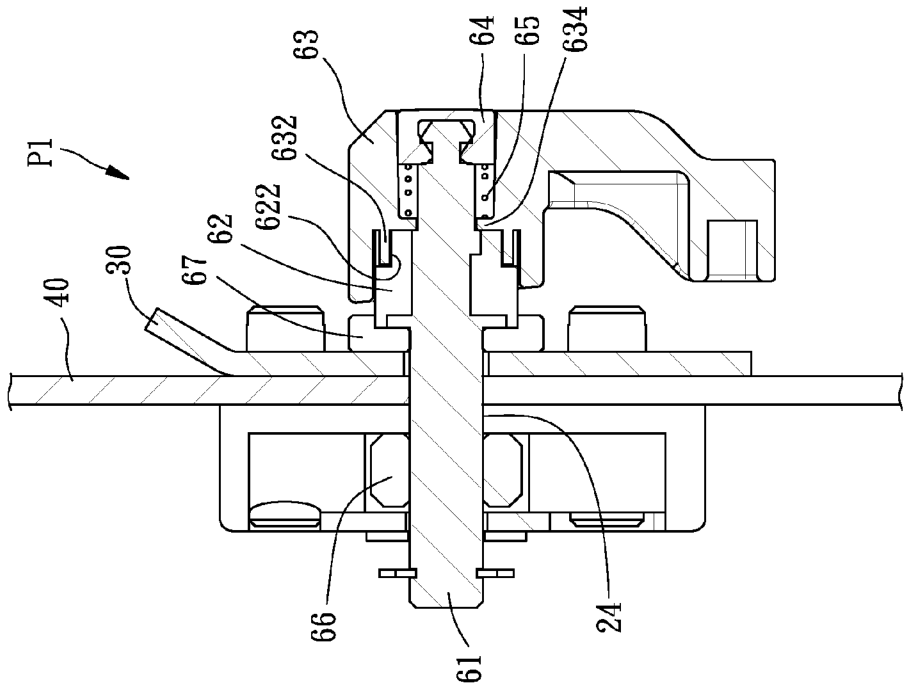
FIG. 3 is a sectional view of the saw machine riving knife adjustment mechanism in accordance with the present disclosure, and showing the handle in the engaged position.

As shown in FIG. 3 and FIG. 2, a lock device set 60 is adapted for locking the riving knife 40 to the locating frame 20. The lock device set 60 includes a locking member 61, a hold down block 62, a handle 63, a plug 64, and a second biasing member 65. The locking member 61 is inserted with a free end thereof passing through, in order, the second long slot 32 of the locating plate 30, the longitudinal slot 42 of the riving knife 40, and the first long slot 24 of the locating frame 20. The free end of the locking member 61 is then screwed through a stop block 66, which is biased by the first biasing member 50.

The hold down block 62 is tightly mounted on the locking member 61, and has an external toothed portion 622 on the periphery thereof. The handle 63 is arranged on the head end of the locking member 61, and includes an internal toothed portion 632 and a flange 634 adjacent to the internal toothed portion 632.

Figure 4:
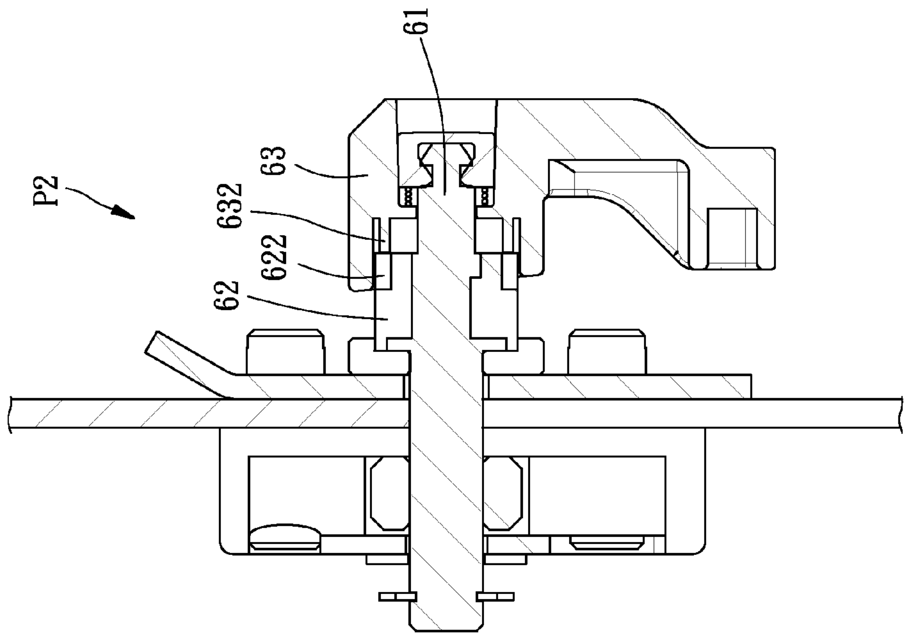
FIG. 4 is a sectional view of the saw machine riving knife adjustment mechanism in accordance with the present disclosure, and showing the handle in the disengaged position.

The handle 63 is axially movable along the locking member 61 between an engaged position P1, shown in FIG. 3 and a disengaged position P2, shown in FIG. 4. When the handle 63 is in the engaged position P1, as shown in FIG. 3, the internal toothed portion 632 of the handle 63 meshes with the external toothed portion 622 of the hold down block 62, enabling the locking member 61 to be rotated with the hold down block 62 by rotation of the handle 63.

When the handle 63 is in the disengaged position P2, as shown in FIG. 4, the internal toothed portion 632 of the handle 63 is disengaged from the external toothed portion 622 of the hold down block 62, allowing free rotation of the handle 63 relative to the locking member 61. The plug member 64 is retained on the head end of the locking member 61 and is positioned within the handle 63. The second biasing member 65 is positioned between the flange 634 of the handle 63 and the plug member 64 to impart a spring force to the handle 63, thus holding the handle 63 in the engaged position P1.

Figure 5:
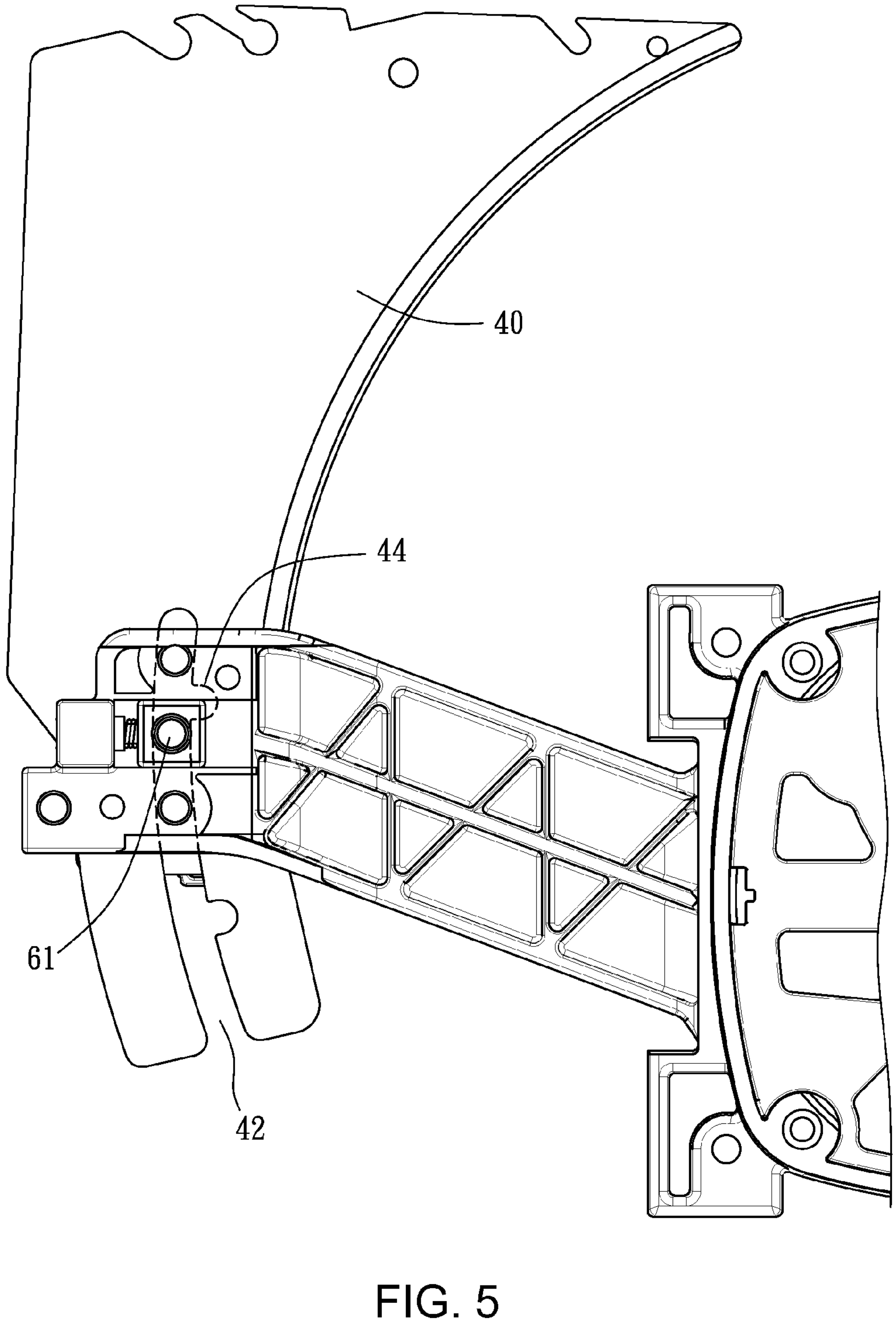
FIG. 5 is a rear side view of the saw machine riving knife adjustment mechanism in accordance with the present disclosure, and showing the locking member disengaged from the notches of the riving knife.
Figure 6:
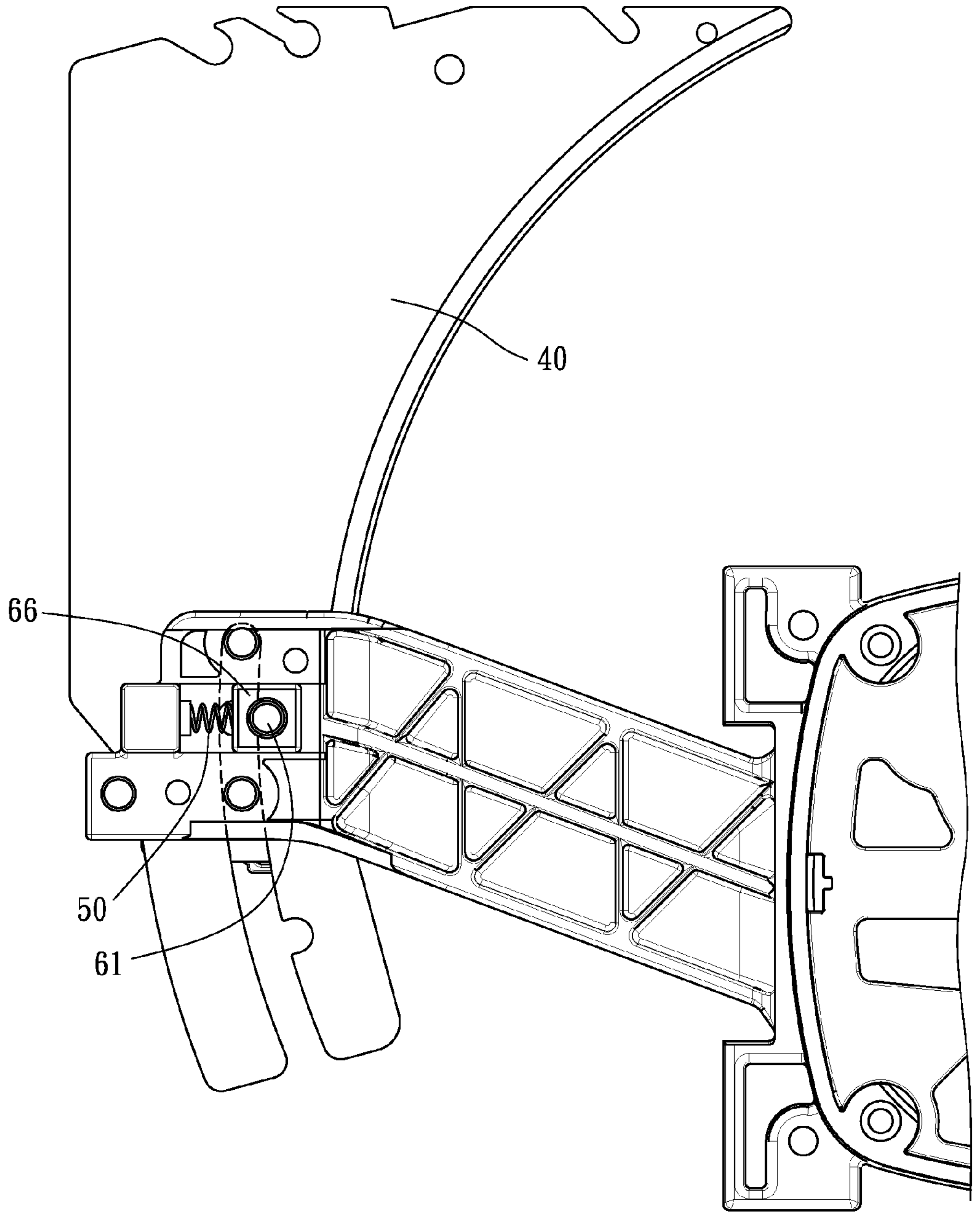
FIG. 6 is a rear side view of the saw machine riving knife adjustment mechanism in accordance with the present disclosure, and showing the locking member engaged into one notch of the riving knife.

In order to lock the riving knife 40 to the saw machine, the user can adjust the position of the riving knife 40 along the longitudinal slot 42 relative to the locking member 61, as shown in FIG. 5, in order to align the locking member 61 with one notch 44 of the riving knife 40. At this time, the stop block 66 receives a biasing force from the first biasing member 50, causing the locking member 61 to be moved transversely into the notch 44 of the riving knife 40, as shown in FIG. 6. Thereafter, the user can operate the handle 63 to rotate the locking member 61, causing the stop block 66 to be moved toward the riving knife 40 (by way of the screw engagement between the locking member 61 and the stop block 66), and at the same time causing the hold down block 62 to press a cushion 67 (provided on the locking member 61) against the locating plate 30. In this manner, the riving knife 40 is held down between the locating frame 20 and the locating plate 30, and therefore the riving knife 40 is locked, as shown in FIG. 3.

In order to dismount the riving knife 40 from the saw machine, the user can rotate the handle 63 in the opposite direction to loosen the locking member 61 from the stop block 66 and to thus release the hold down block 62 from the riving knife 40. The user can then apply a pressure to overcome the spring force provided by the first biasing member 50 to the stop block 66, enabling the locking member 61 to be moved away from the respective notch 44 of the riving knife 40 into the longitudinal slot 42 of the riving knife 40. At this time, the operator can remove the riving knife 40 from the locking member 61 along its longitudinal slot 42.

Further, in order to facilitate rotation of the handle 63 and to avoid interference of the handle 63 with other component parts, the operator can move the handle 63 outwardly from the engaged position P1 to the disengaged position P2, as shown in FIG. 4. At this time, the handle 63 can be rotated to a desired position and then released, enabling the handle 63 to be returned to the engaged position P1, and in a more desirable orientation, for rotating the locking member 61.

In conclusion, the saw machine riving knife adjustment mechanism assures accurate and positive positioning of the riving knife, and facilitates dismounting of the riving knife from the saw machine.

The present disclosure having been thus described with particular reference to the preferred embodiments thereof, it will be obvious that various changes and modifications may be made therein without departing from the spirit and scope of the present disclosure as defined in the disclosure and the claims.

What is claimed is:

1. A saw machine riving knife adjustment mechanism for a saw machine having a saw blade, comprising:

a locating frame having a first slot;

a riving knife located adjacent to said saw blade, and having a longitudinal slot and at least one notch recessed from a peripheral wall of said longitudinal slot;

a first biasing member mounted in said locating frame; and a locking member inserted through said longitudinal slot of said riving knife and said first slot of said locating frame to lock said riving knife to said locating frame;

wherein the locking member is selectively biased by a spring force of said first biasing member in a direction transverse to the longitudinal axis of the locking member into engagement with said at least one notch of said longitudinal slot of said riving knife.

2. The saw machine riving knife adjustment mechanism according to claim 1, further comprising a stop block threaded onto said locking member and abutting said first biasing member.

3. The saw machine riving knife adjustment mechanism according to claim 2, further comprising a hold down block and a handle, said hold down block being arranged on said locking member and having a first toothed portion, said handle being arranged on said locking member and having a second toothed portion, the handle being axially movable along said locking member between an engaged position, where said second toothed portion of said handle is engaged with said first toothed portion of said hold down block for enabling said handle to rotate said hold down block and said locking member, and a disengaged position, where said second toothed portion of said handle is disengaged from said first toothed portion of said hold down block for enabling said handle to be rotated relative to said locking member.

4. The saw machine riving knife adjustment mechanism according to claim 3, further comprising a plug member mounted on said locking member, and a second biasing member positioned between a flange of said handle and said plug member to impart a spring force to said handle to maintain said handle in said engaged position.

5. The saw machine riving knife adjustment mechanism according to claim 1, further comprising a locating plate affixed to said locating frame for enabling said riving knife to be positioned between said locating frame and said locating plate, said locating plate having a second slot through which said locking member passes.

6. The saw machine riving knife adjustment mechanism according to claim 1, further comprising at least one locating rod fixedly located on said locating frame for supporting and guiding said riving knife.

7. The saw machine riving knife adjustment mechanism according to claim 1, wherein the at least one notch comprises two notches spaced along one side of said longitudinal slot.

8. The saw machine riving knife adjustment mechanism according to claim 5, further comprising a cushion and a hold down block arranged on said locking member, said cushion being positioned between said locating plate and said hold down block.

9. The saw machine riving knife adjustment mechanism according to claim 6, wherein the at least one locating rod comprises two locating rods extending from said locating frame and respectively positioned on first and second opposed sides of the first slot of said locating frame.

10. The saw machine riving knife adjustment mechanism according to claim 2, said stop block further abutting said locating frame, wherein the stop block is moved relative to the locating frame when the locking member is selectively biased by said first biasing member into engagement with said at least one notch of said riving knife.

11. The saw machine riving knife adjustment mechanism according to claim 10, further comprising a hold down block and a handle, said hold down block being arranged on said locking member and having a first toothed portion, said handle being arranged on said locking member and having a second toothed portion, the handle being axially movable along said locking member between an engaged position, where said second toothed portion of said handle is engaged with said first toothed portion of said hold down block for enabling said handle to rotate said hold down block and said locking member, and a disengaged position, where said second toothed portion of said handle is disengaged from said first toothed portion of said hold down block for enabling said handle to be rotated relative to said locking member.

12. The saw machine riving knife adjustment mechanism according to claim 11, further comprising a plug member mounted on said locking member, and a second biasing member positioned between a flange of said handle and said plug member to impart a spring force to said handle to maintain said handle in said engaged position.

13. The saw machine riving knife adjustment mechanism according to claim 10, wherein the at least one notch comprises a first straight side, a middle arcuate section, and a second straight side, wherein said first straight section is parallel and opposed to said second straight side.

14. The saw machine riving knife adjustment mechanism according to claim 13, wherein the at least one notch comprises two notches spaced along one side of said longitudinal slot.

15. A saw machine riving knife adjustment mechanism for a saw machine having a saw blade, comprising:

a locating frame having a first slot;

a riving knife located adjacent to said saw blade, and having a longitudinal slot and at least one notch recessed from a peripheral wall of said longitudinal slot;

a first biasing member mounted in the locating frame; and a locking member inserted through said longitudinal slot of said riving knife and said first slot of said locating frame to lock said riving knife to said locating frame;

wherein the locking member is selectively biased transversely relative to the longitudinal axis of the locking member by a spring force of said first biasing member from a first position in the longitudinal slot to a second position of engagement with said at least one notch of said longitudinal slot of said riving knife when the locking member is aligned with said at least one notch.

16. The saw machine riving knife adjustment mechanism according to claim 15, further comprising a hold down block, a handle, a plug member mounted on said locking member, and a second biasing member, said hold down block being arranged on said locking member and having a first notched toothed portion, said handle being arranged on said locking member and having a second notched toothed portion, and said second biasing member arranged axially perpendicular to said first biasing member.

17. The saw machine riving knife adjustment mechanism according to claim 16, wherein the at least one notch comprises two notches spaced along one side of said longitudinal slot.

18. The saw machine riving knife adjustment mechanism according to claim 16, wherein the at least one notch has a depth equal to or less than a cross section of the locking member.

* * * * *